United States Patent [19]

Schaede

[11] Patent Number: 5,575,572
[45] Date of Patent: Nov. 19, 1996

[54] BEARING BUSHING

[75] Inventor: Johannes G. Schaede, Würzburg, Germany

[73] Assignee: Koenig & Bauer-Albert Aktiengesellschaft, Germany

[21] Appl. No.: 542,738

[22] Filed: Oct. 13, 1995

[30] Foreign Application Priority Data

Oct. 13, 1994 [DE] Germany .......................... 44 36 629.9

[51] Int. Cl.⁶ .................................................. F16C 43/04
[52] U.S. Cl. ........................ 384/585; 384/447; 384/535; 384/537
[58] Field of Search .................................. 384/447, 535, 384/537, 556, 569, 581, 584, 585

[56] References Cited

U.S. PATENT DOCUMENTS

| | | | |
|---|---|---|---|
| 3,009,748 | 11/1961 | Pitner | 384/581 |
| 3,214,225 | 10/1965 | Warnery | 384/447 |
| 3,219,399 | 11/1965 | Smith | 384/581 |
| 4,035,044 | 7/1977 | Miyazaki | 384/447 |
| 4,898,481 | 2/1990 | Hamblin | 384/535 X |
| 4,909,641 | 3/1990 | McKenzie | 384/447 X |

FOREIGN PATENT DOCUMENTS

| | | |
|---|---|---|
| 0064064 | 5/1968 | Germany . |
| 2337309 | 6/1983 | Germany . |

OTHER PUBLICATIONS

*Konstruction;* "Entwicklungsstand Und Entwicklungsmöglichkeiten . . . "; Nov. 30, 1961; Dr.–Ing. G. Hentschel; pp. 443–450.

*Primary Examiner*—Daniel P. Stodola
*Attorney, Agent, or Firm*—Jones, Tullar & Cooper, P.C.

[57] ABSTRACT

A bearing bushing supports a bearing assembly of a cylinder journal in a frame bore. The bearing bushing utilizes an inner ring and an outer ring. Both rings are provided with varying wall thickness. A pressure chamber is defined between the two rings in an area away from the resultant of the forces acting on the bushing. A pressure medium can be supplied to this pressure chamber to tightly secure the bearing bushing in the frame bore.

7 Claims, 4 Drawing Sheets

BEARING BUSHING

FIELD OF THE INVENTION

The present invention is directed generally to a bearing bushing. More particularly, the present invention is directed to a bearing bushing for a cylinder of a rotary printing press. Most specifically, the present invention is directed to a bearing bushing for a cylinder of a rotary press which accomplished the secure positioning of the bushing in a frame of the printing press. The bearing bushing has an inner ring and an outer ring. The bushing inner and outer rings are arranged with respect to each other so as to form a pressure chamber which extends around a section of the periphery of the bushing and which is located generally diametrically opposite to a force resultant acting on the bushing. A pressure medium can be supplied to the pressure chamber to expand and to thus secure the bushing in the frame bore.

DESCRIPTION OF THE PRIOR ART

In rotary printing presses, the cylinder journals of various ones of the printing press cylinders are supported by bearing assemblies in bores that are formed in the side frames of the printing press. It is quite typical for the bearings to be supported by bearing bushings which are positioned in the frame bores and which act as an intermediate support between the cylinder journal bearing and the frame itself. One common expedient is to provide the bearing bushing as an eccentric so that the positioning of the supported cylinder in the press frame can be changed. Clearly, the bearing bushing must be rotatable in the frame bore in order to shift the cylinder's position. It must also be capable of being secured in whatever position it is placed. Otherwise it will shift under load and the cylinder's positioning will be altered.

One prior art device that is usable to accomplish the secure or tight holding of a bearing bushing for a cylinder bearing is disclosed in German patent No. DE-PS 0064064. In this prior art device, the bearing bushings are pressed hydraulically against a bore wall in a machine frame. In this prior art device, the bearing bushings consist of two bushing sleeves that are shrink fit onto each other. Two hydraulically chargeable pressure chambers are cut into the inner wall of the outer bushing sleeve. These two hydraulic pressure chambers are located at an angle of generally 120° with respect to the force resultant acting on the bushing.

A limitation of this prior art device is that the deformation of the outer bushing sleeve, which is caused by the application of the pressure fluid to the pressure chambers, takes place over a very narrow range of the surface of the outer bushing sleeve. This causes essentially a linear or a narrow band or strip shaped surface area pressure which acts between the outer surface of the outer bushing sleeve and the inner surface of the frame bore. This results in a very high surface pressure on the material and can lead to overstressing of the material.

It will thus be seen that a need exists for a bushing assembly which will allow radial shifting of the eccentric bushing in the frame bore but which will accomplish the positive and secure holding of the bushing in the bore in a desired orientation. The bearing bushing in accordance with the present invention provides such a device and is a significant improvement over the prior art.

SUMMARY OF THE INVENTION

It is an object of the present invention to provide a bearing bushing.

Another object of the present invention is to provide a bearing bushing for a cylinder of a rotary printing press.

A further object of the present invention is to provide a bearing bushing which accomplishes the tight and secure holding of the bearing bushing in a frame bore.

Still another object of the present invention is to provide a bearing bushing which has a great radial rigidity.

Even yet a further object of the present invention is to provide a bearing bushing which has a large surface area contact with the frame bore.

Yet still another object of the present invention is to provide a bearing bushing which is easily insertable into the frame bore.

As will be discussed in detail in the description of the preferred embodiments, which is presented subsequently, the bearing bushing in accordance with the present invention includes an inner ring and an outer ring. The inner ring has a cylinder journal bearing receiving inner bore and an outer surface. The outer ring has an inner surface, which overlies the outer surface of the inner ring, and an outer surface that is engageable with the inner surface of the press frame bore that receives the bearing bushing. A pressure chamber, that can receive a pressure medium, is provided between the outer surface of the inner ring and the inner surface of the outer ring. This pressure chamber extends over an angle of between 60° and 120° in the circumferential direction of the bushing. This pressure chamber is positioned generally diametrically opposing the line of action of the resultant of the forces acting on the bearing bushing. When a pressure medium is supplied to the pressure chamber, the outer ring of the bearing bushing is caused to move radially outwardly to engage the frame bore in a tight, secure manner. The contact force between the outer surface of the outer ring and the frame bore is distributed over a generally large surface area.

Because the bearing bushing of the present invention has only one segment-shaped pressure chamber, a radial rigidity of the bearing bushing is accomplished. A laminar or sheet-like force transfer between the outer surface of the outer ring of the bearing bushing and the surface of the frame bore is made possible due to the pressure chamber extending over a large area. A relatively low surface pressure will provide a relatively high pressure bearing bushing holding or securement force. This high pressure holding force is achieved at a comparatively low pressure of the pressure medium. This allows the use of simple, low-cost devices for generators of the pressure and for conveying the pressure medium to the pressure chamber.

The secure pressing of the bearing bushing outer ring to the surface of the frame bore over a large area is assured by the provision of the large pressure chamber. It is also possible to absorb changing forces in a very effective manner. These changing forces may be caused by dynamic loads that are not acting in the direction of the resultant force that is of the largest size.

Another particular advantage of the bearing bushing in accordance with the present invention is that it is possible to accomplish the final finishing or machining of the outer surface of the outer ring after the inner and the outer rings of the bearing bushing have been connected together. The areas of the outer shell surface of the inner ring, which remain between the depressions or the channels formed in the shell surface of the inner ring, support the inner surface of the outer ring, while the outer surface of the outer ring is being worked on, for example, by a grinding disk. This support of the outer ring by the inner ring facilitates the accurate machining of the outer surface of the outer ring so that its final dimensions will be accurate. It is possible, for example, to start with an outer ring, supported by the inner ring, whose initially shape is generally cylindrical. It is then possible to shape this outer ring into its desired eccentric shaped outer ring which has a reduced wall thickness in the area of the pressure chamber. This allows a good stability of the bearing bushing's shape to be provided during production of the bearing bushing. This good stability and accuracy of shape is particularly important in the area of the pressure chamber which is where the wall thickness of the outer ring of the bearing bushing is the least.

The bearing bushing in accordance with the present invention may be provided with a single, steadily extending depression. This allows the pressure chamber to be simply and positively vented.

The bearing bushing of the present invention overcomes the limitations of the prior art devices. It is a substantial advance in the art.

BRIEF DESCRIPTION OF THE DRAWINGS

While the novel features of the bearing bushing in accordance with the present invention are set forth with particularity in the appended claims, a full and complete understanding of the invention may be had by referring to the detailed description of the preferred embodiments which is presented subsequently, and as illustrated in the accompanying drawings, in which:

DETAILED DESCRIPTION OF THE PREFERRED EMBODIMENTS

Figure 1:
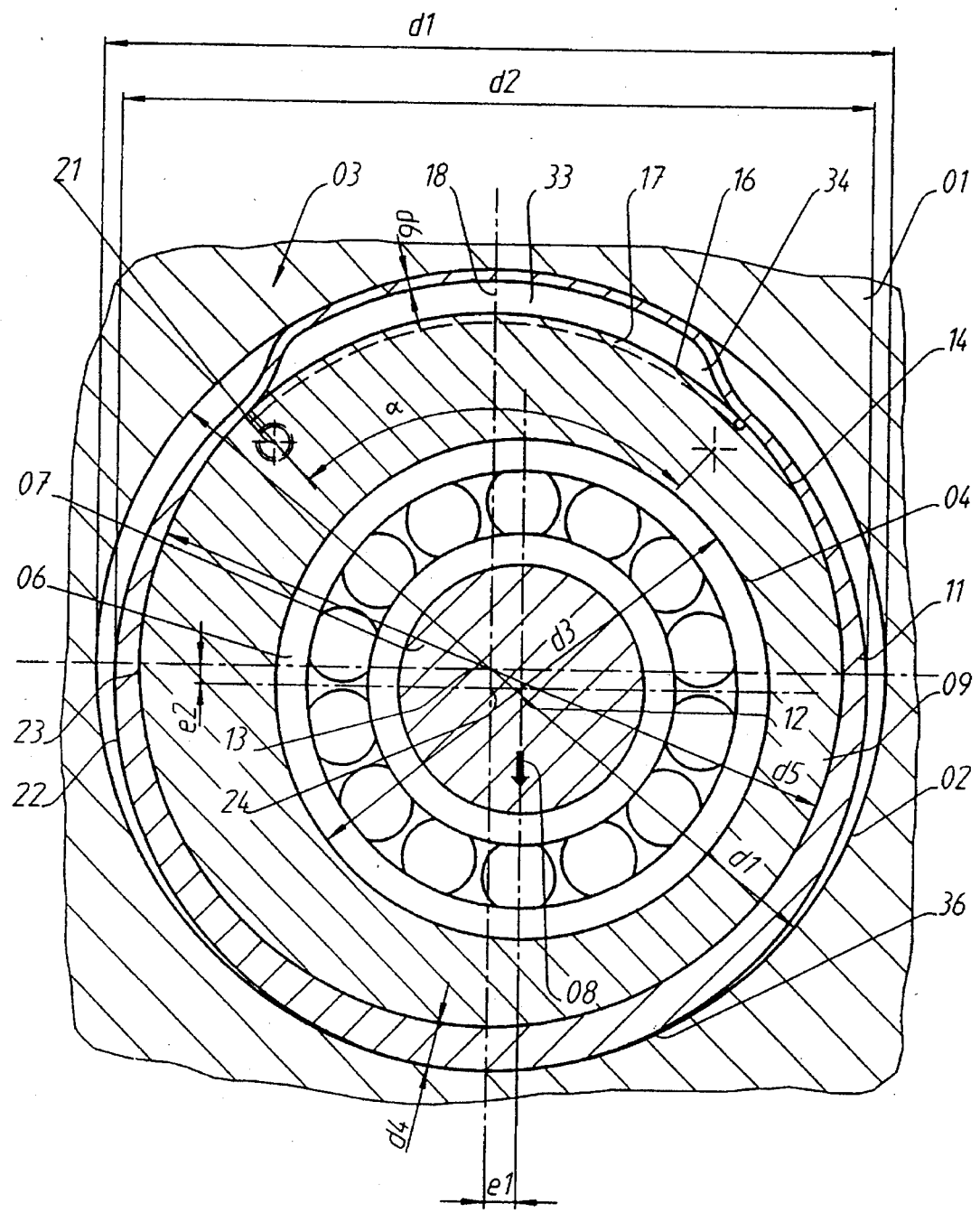
FIG. 1 is a schematic sectional view of a first preferred embodiment of a bearing bushing in accordance with the present invention.
Figure 2:
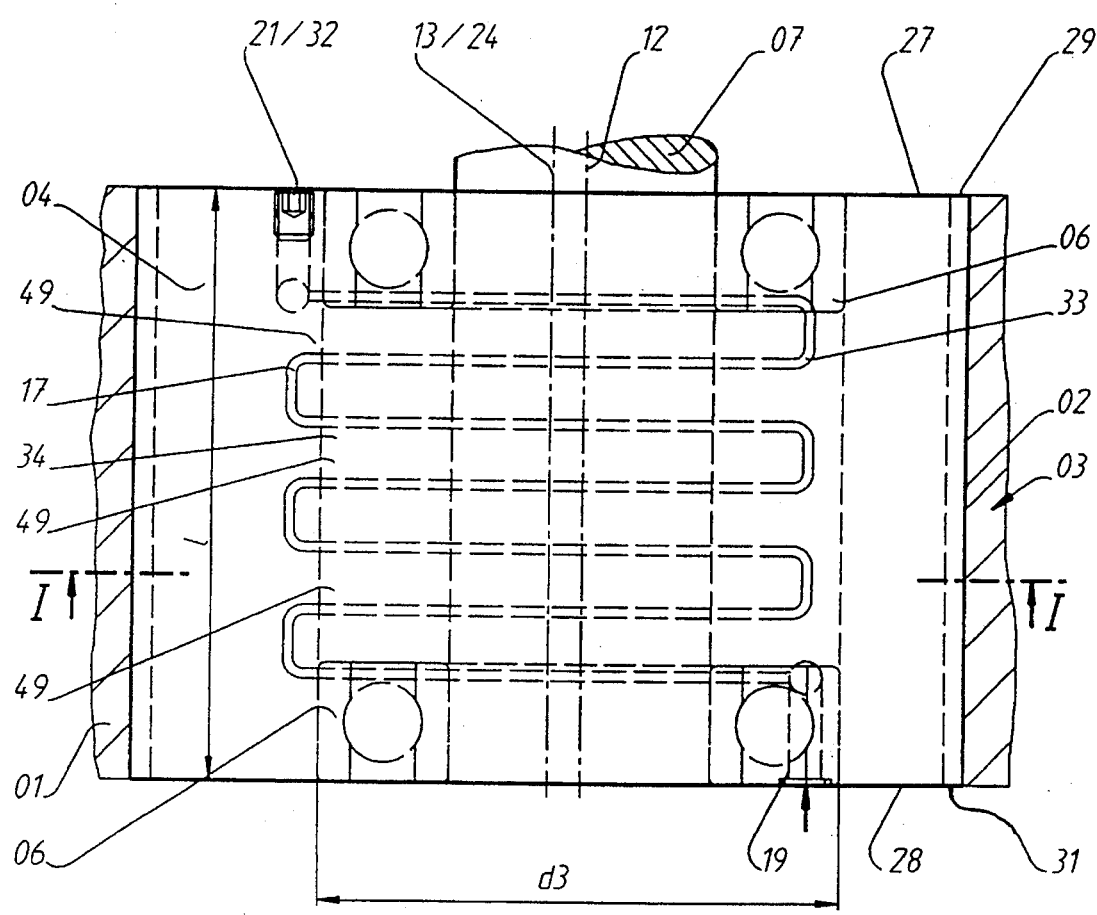
FIG. 2 is a top plan view, partly in section of the bearing bushing depicted in FIG. 1.

Referring initially to FIGS. 1 and 2, there may be seen a first preferred embodiment of a bearing bushing, generally at 3, for a cylinder in a rotary printing press in accordance with the present invention. While the bearing bushing will be discussed hereinafter in conjunction with a printing press having cylinders with cylinder journals, the bearing bushing of the present invention is not limited to use only in connection with cylinders in a printing press but could be utilized to position and support any bearing assembly in a bore. As may be seen most clearly in FIG. 1, the bearing bushing 3 is generally cylindrical in shape and has an overall outer diameter "d2" of, for example, approximately 300 mm, and an overall length "1" as may be seen in FIG. 2, of, for example, 250 mm. The bearing bushing 3 is situated in a bore 2 that is formed in a side frame 1 of a rotary printing press. The bore 2 has an internal diameter, "d1", of generally 300 mm. It will be understood that for the sake of clarity of illustration the diameters "d1" and "d2" are depicted as quite different in FIG. 1. This is only for the purposes of illustration. In actuality, the interior diameter "d1" of the press frame bore 2 will be greater than the outer diameter "d2" of the bearing bushing 3 by only a few tenths of a millimeter.

Thus the bearing bushing 3 can be placed within the frame bore 2 and will be adjustable within the frame bore 2.

The bearing bushing 3 is provided with a generally central bore 4 which has an inner diameter "d3", of, for example 250 mm, for receiving a bearing 6 of a journal 7 of a cylinder. The bearing 6 can be embodied in the form of a known ball or roller bearing or as a friction bearing, free of play. The bore 4 of the bearing bushing 3 can be situated centered or eccentrically with respect to the bore 2 in the press frame 1. In the bearing bushing 3 shown in FIG. 1, the central bore 4 of the bearing bushing 3 and the bore 2 in the frame 1 lie eccentrically with respect to each other by an amount of eccentricity "e1", of, for example 15 mm. This allows for the accomplishment of a position change of the cylinder with respect to the frame 1 and therefore possibly also with respect to one or more other press cylinders, by means of rotational movement of the bearing bushing 3 in the bore 2 in the frame 1. It is possible, by means of this position change, to vary the distance between two cylinders, for example for adjustment work or for releasing cylinder pressure.

As a result of the combined action of the cylinder seated in the bearing bushing 3 with one or more further cylinders, and also due to gravitational forces, a resultant 8 of the forces acting on the bearing bushing 3 ensues. This resultant force 8 can either be static or can dynamically change its size or direction, for example by changing pressure forces acting on the supported cylinder. The resultant force 8 with the largest size will be considered in the discussion which follows.

As may be seen in both FIGS. 1 and 2, the bearing bushing 3 is generally in the form of an inner ring or sleeve 9 and an outer ring or sleeve 11. The inner ring 9 is generally in the shape of a hollow cylinder. In this inner ring 9, the journal bearing receiving central bore 4 has a central axis 12. This central axis 12 of the central bore 4 is eccentric with respect to a center axis 13 of an outer shell surface 14 of the inner ring 9. Stated differentially, the central bore 4 in the inner ring 9 is offset from the center of the inner ring 9.

As is shown more clearly in FIG. 2, a plurality of groove-like depressions 17 are cut into a segment 16 of the outer shell surface 14 of the inner ring 9. These depressions 17 extend over the arcuate peripheral segment 16 of the inner ring 9 through a segment angle $\alpha$ of generally between 60° and 120° in the circumferential direction. As viewed in FIG. 1, this grooved segment 16 of the outer shell 14 of the inner ring 9 of bearing bushing 3 is disposed on the surface of shell 14 which is diametrically opposed to the direction of the resultant forces 8 which are along the bearing bushing 3. A median 18 of this grooved peripheral segment 16 lies generally parallel to the resultant force line 8 and is displaced therefrom by an amount of eccentricity "e1".

The groove-like depressions 17 can be embodied as a system of several individual depressions 17, which are connected with each other as may be seen in FIG. 2. A single, continuing depression 17, extending in a generally serpentine or repeating shape, and whose respective ends terminate in connecting bores 19 and 21, is depicted in the first embodiment. The number and position of the individual loops of the serpentine-like extending depression 17 can be varied.

The outer ring 11 of the bearing bushing 3 is placed closely overlying or surrounding, for example, by means of a press fit, on this inner ring 9. The outer ring 11 can consist of a pipe with a wall thickness "d4" of, for example 5 mm to 10 mm. In the first preferred embodiment, the outer ring 11 is embodied as an eccentric pipe, generally in the shape of a hollow cylinder, whose outer shell surface 22 has an outer diameter "d2" and whose inner bore 23 has an inner diameter "d5", of, for example, 288 mm. A center axis 24 of the outer ring 11 is displaced downwardly by an eccentricity "e2", of, for example, 3 mm, lying on the median 18 and away from the direction of the grooved segment 16, with respect to the center axis 13 of the bore 23 of the outer ring 11. This eccentricity "e2" results in a reduced wall thickness "d6" of 2 to 5 mm in the area of the segment 16 of the outer ring 11. The center axis 24 of the outer shell surface 22 of the outer ring 11 is displaced by the eccentricity "e1" approximately perpendicular with respect to the median 18 of the segment 16, toward the central axis 12 of the bushing central bore 4 of the inner ring 9.

In an eccentric embodiment of the bearing bushing 3; i.e. in an embodiment having an eccentric position of the bushing central bore 4 with respect to the shell surface 22 of the outer ring 11, the eccentricity "e2" of the bore 23 of the outer ring 11 preferably is oriented approximately perpendicular with respect to the eccentricity "e1" of the bore 4 of the inner ring 9. In a centered embodiment of the bearing bushing 3; i.e. in a configuration with a centered position of the central bore 4 with respect to the outer ring shell surface 22, the eccentricity "e1" of the center axis 12 of the central bore 4 of the inner ring 9 and of the center axis 24 of the shell surface 22 of the outer ring 11 lie opposite to the eccentricity "e2" of the center axis 13 of the bore 23 of the outer ring 11, and the amount of the eccentricity "e1" is equal to the amount of the eccentricity "e2".

The inner ring 9 of the bearing bushing 3 is tightly and positively connected with the outer ring 11 of the bushing 3 at their respective end faces 27, 28, 29, 31, for example by material contact, such as welding as shown in FIG. 2. However, a frictional connection is also possible with the use of appropriate seals, such as, for example O-rings.

In the operation of the first preferred embodiment of the bearing bushing 3 in accordance with the present invention, the assembled bearing bushing 3 will be inserted into the frame bore 2 and will be positioned so that the depression or grooved surface segment 16 will be oriented generally opposed to the resultant force 8 and thus will be situated generally as depicted in FIG. 1. The first connecting bore 19 of the serpentine array of depressions 17, which result when the inner ring 9 is enclosed by the outer ring 11 to form the closed conduit 17, is connected with a pressure medium source, while the second connecting bore 21 is closed by means of a suitable stopper 32, after the conduit 17 has been vented. If the conduit 17 is now charged with a pressure medium 33, the outer ring 11 is radially deformed, particularly in the area of the segment 16. Because of this deformation of the surface of the outer ring 11, a gap is created in the area of the segment 16 between the inner and outer rings 9, 11. Further pressure medium 33 can be forced into this area and thus the entire area of the segment 16 is charged with the pressure medium 33. The entire area of the segment 16 between the inner and outer rings 9 and 11 therefore forms a pressure chamber 34. No deformation of the opposite portion of the outer ring 11 occurs, due, in part to the fact that pressure medium 33 effectively cannot enter this area between rings 9 and 11 through the possibly existing minimal gap and, due, also in part to the increased wall thickness "d4" of the outer ring 11 in the area of the resultant force 8, which prevents deformation of this wall. Hydraulic oil is preferably used as the pressure medium 33, but other materials, such as compressed air, grease, paste or finely granulated materials are suitable.

The thin walled portion of the shell surface 22 of the outer ring 11, which is radially deformed outwardly by the pressure chamber 34, pushes the bearing bushing 3 against the inner shell surface 36 of the bore 2 in the frame in the direction of the resultant 8 of the effective forces with an additional laminar force which is generated by the pressure chamber 34. By means of this force, the shell surface 22 of the outer ring 11 is matched in the area of the pressure chamber 34 to the inner shell surface 36 of the bore 2 in the frame. This has the effect of positively securing the bearing bushing 3 in the frame bore 2 so that there will not be any movement of the bushing 3 in the bore 2. When the position of the bushing 3 is to be changed, the pressure can be released by removing the pressure medium from the pressure chamber 34. Once this has been done, the bearing bushing 3 can be realigned, as may be necessary.

Figure 3:
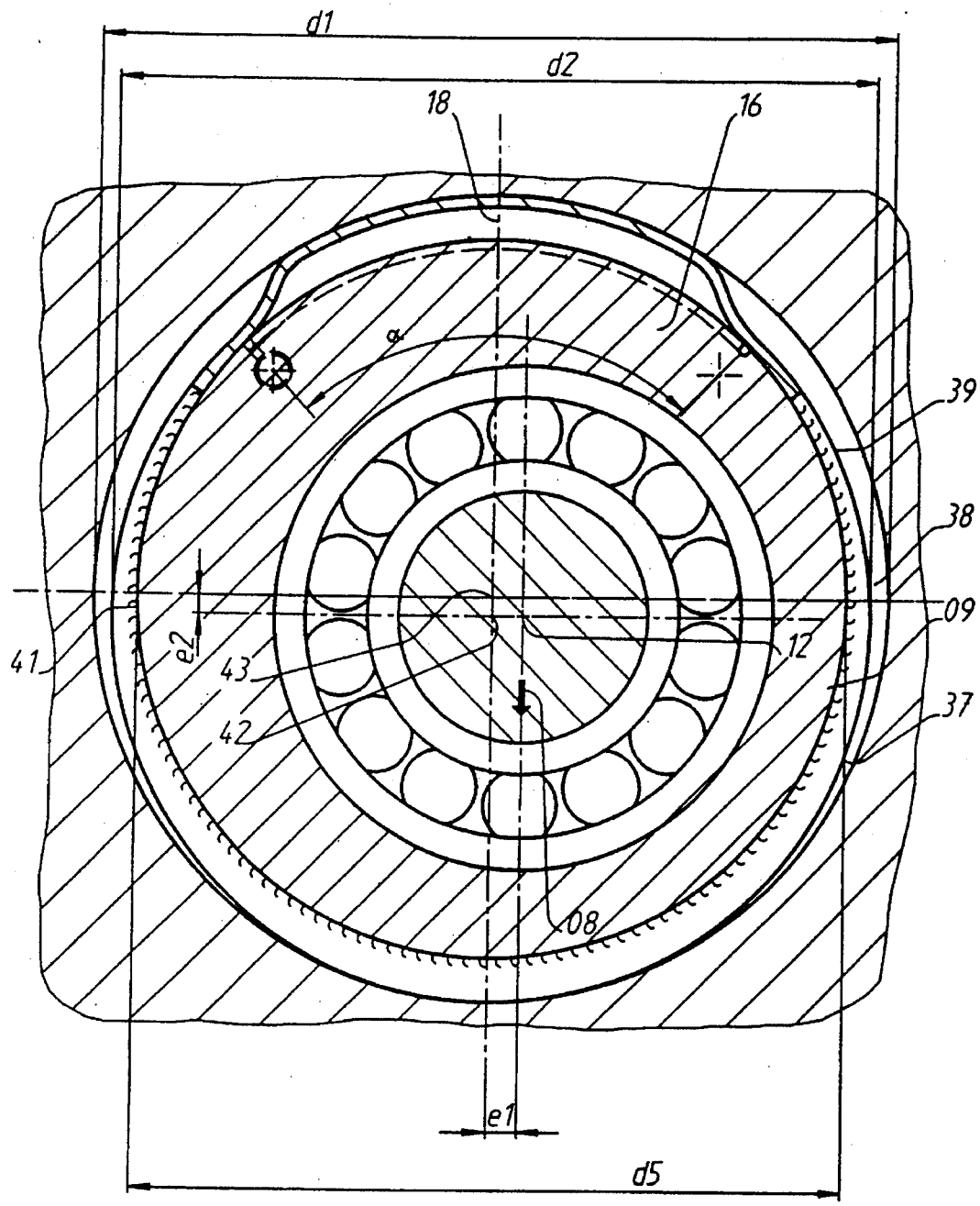
FIG. 3 is a cross-sectional view of a second preferred embodiment of the bearing bushing in accordance with the present invention.
Figure 4:
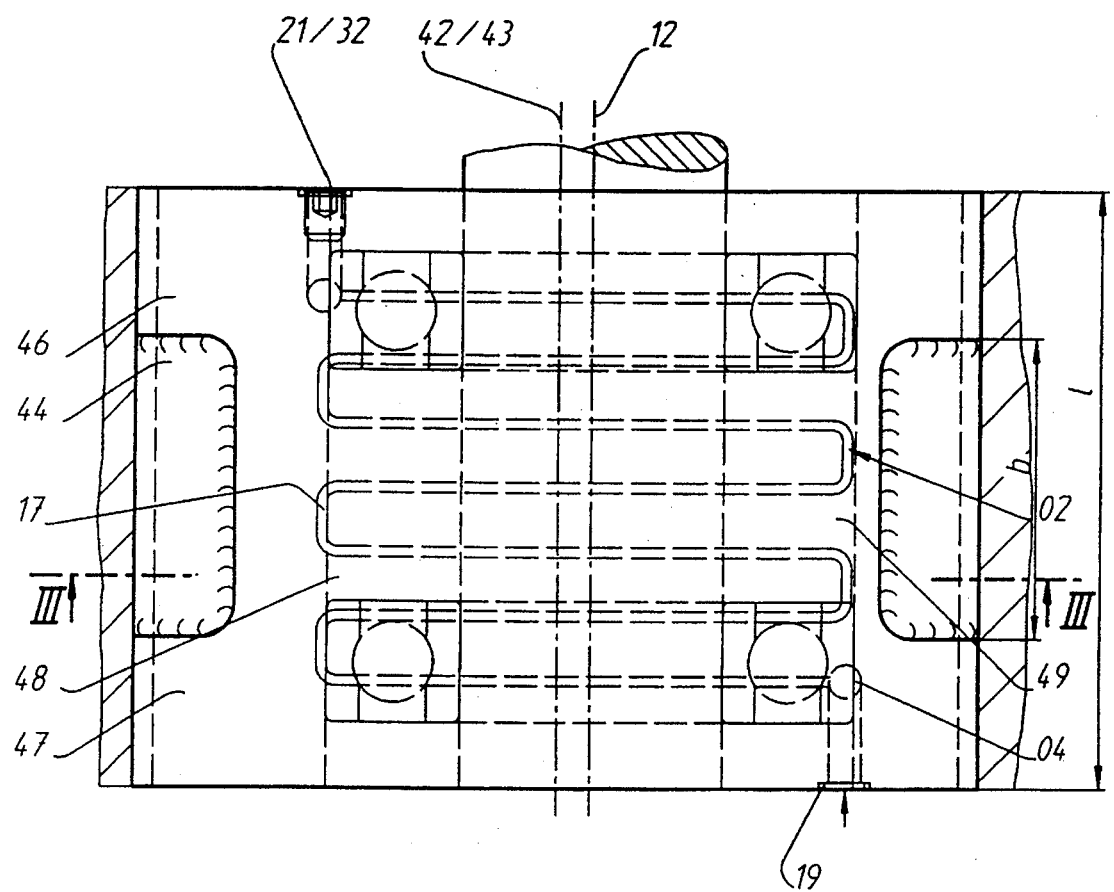
FIG. 4 is a top plan view, partly in section, of the bearing bushing of FIG. 3.

Turning now to FIGS. 3 and 4, there may be seen a second preferred embodiment of a bearing bushing, generally at 37, in accordance with the present invention. In this second preferred embodiment 37 of the bearing bushing, the inner ring 9 corresponds with the inner ring 9 of the bearing bushing 3 of the first preferred embodiment. The outer ring 38 of this second preferred embodiment of bearing bushing 37 is somewhat different.

As may be seen in FIGS. 3 and 4, the outer ring 38 of the bearing bushing 37 can consist of a pipe, such as an eccentric pipe that is in the shape of a hollow cylinder. This outer ring 38 which is used in the second preferred embodiment, has approximately the outer diameter "d2" on its shell surface 39 and the inner diameter "d5" in its bore 41. A center axis 42 of the shell surface 39 of the outer ring 38 is eccentrically displaced by the amount of eccentricity "e2" and is located on the median 18 and shifted away from the direction of the segment 16 with respect to the center axis 43 of the bore 41 of the outer ring 38. The eccentricity "e2" of the bore 41 of the outer ring 38 preferably is approximately perpendicular with respect to the eccentricity "e1" of the bore 4 of the inner ring 9.

Referring now most particularly to FIG. 4, the outer ring 38 is provided, on its outer shell, with a segment-like, circumferential outer recess 44 that is formed so that two spaced, eccentric, band-shaped support rings 46 and 47 are created. These support rings 46 and 47 are spaced at a distance "b" and are connected by means of a shell-shaped segment 48 of the width "b", and extending over the segment angle α. The width "b" may be approximately 200 mm which is less than the axial length "1" of the bearing bushing 37. As was the case with the first preferred embodiment of the bearing bushing 3, the outer ring 38 in this second preferred embodiment is connected along the outer contour with the inner ring 9 by means of suitable material contact, such as, for example by welding.

The bearing bushing 37 of the second preferred embodiment functions in a manner essentially the same as that of the first preferred embodiment of the bearing bushing 3. A reduced area, but defined, clear contact surface is created in the direction of the force resultant 8 over the length "1" of the bearing bushing 37 by means of the support rings 46 and 47. This structure of the bearing bushing 37 is able to tolerate fairly significant shape and positional errors in the frame bore 2.

In both embodiments 3 and 37 of the bearing bushing in accordance with the present invention it is possible to cut or otherwise form depressions or grooves 17 in the inner surface of the outer ring 11 or 38, instead of in the outer surface of the inner ring 9. The supporting parts or areas 49 on the shell surface 14 of the inner ring 9 remains between the grooves or the depressions 17 in both embodiments, as may be seen in FIGS. 2 and 4.

While preferred embodiments of a bearing bushing for a cylinder of a rotary printing press in accordance with the present invention has been set forth fully and completely hereinabove, it will be apparent to one of skill in the art that a number of changes in, for example, the overall size of the bushing, the type of cylinder supported by the bushing, the source of the pressure medium and the like may be made without departing from the true spirit and scope of the present invention which is accordingly to be limited only by the following claims.

What is claimed is:

1. A bearing bushing usable to support a cylinder journal bearing in a bore in the frame of a rotary printing press, said bearing bushing comprising:

an inner ring having a bearing receiving central bore and an inner ring outer surface;

an outer ring having an outer ring inner surface and an outer, frame bore engaging surface; and a pressure chamber formed between said inner ring and said outer ring, said pressure chamber having a circumferential segment angle of between 60° and 120° and being disposed generally opposite from a resultant of effective forces acting on said bearing bushing, said pressure chamber being chargeable with a pressure medium.

2. The bearing bushing of claim 1 wherein one of said inner ring outer surface and said outer ring inner surface is provided in the area of said pressure chamber with a plurality of interconnected depressions separated by supporting surfaces, said depressions being chargeable with a pressure medium.

3. The bearing bushing of claim 1 wherein one of said inner ring outer surface and said outer ring inner surface is provided in the area of said pressure chamber with a single extended depression having a serpentine path separated by supporting surfaces, said depression being chargeable with a pressure medium.

4. The bearing bushing of claim 1 wherein said central bore of said inner ring has a central bore axis and wherein said inner ring outer surface has an outer surface center axis, said central bore axis being eccentrically disposed with respect to said center axis and further wherein said outer ring has an outer ring bore with an outer ring bore axis, said outer ring bore axis being disposed equidistantly eccentrically from a median line of said pressure chamber and said outer surface center axis in a direction away from said pressure chamber.

5. The bearing bushing of claim 4 wherein said bearing bushing is an eccentric bearing bushing and wherein said central bore axis is eccentrically positioned with respect to said outer ring bore axis in a direction generally perpendicular to said medium.

6. The bearing bushing of claim 4 wherein said bearing bushing is a centered bearing bushing and wherein said central bore axis and said outer ring bore axis are eccentric in a first eccentric direction and further wherein said center axis is eccentric in a second eccentric direction which is equal and opposite to said first eccentric direction.

7. The bearing bushing of claim 1 wherein said outer frame bore engaging surface is provided with a circumferentially extending recess which divides said bore engaging surface into two eccentric support rings connected by a shell-shaped segment extending over said segment angle.

* * * * *